(12) United States Patent
Shin et al.

(10) Patent No.: US 8,379,038 B2
(45) Date of Patent: Feb. 19, 2013

(54) COLOR DISPLAY APPARATUS AND METHOD THEREFOR

(75) Inventors: Yoon-cheol Shin, Seongnam-si (KR); Dong-bum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1064 days.

(21) Appl. No.: 11/373,442

(22) Filed: Mar. 13, 2006

(65) Prior Publication Data

US 2006/0285136 A1   Dec. 21, 2006

(30) Foreign Application Priority Data

Jun. 21, 2005   (KR) .................. 10-2005-0053494

(51) Int. Cl.
   *G09G 5/02* (2006.01)
(52) U.S. Cl. ........ 345/589; 345/475; 345/596; 345/597; 345/604
(58) Field of Classification Search .................. 345/501, 345/88; 382/239; 362/583
See application file for complete search history.

(56) References Cited

U.S. PATENT DOCUMENTS

| | | | | |
|---|---|---|---|---|
| 4,387,370 | A * | 6/1983 | Katagi ............................ | 345/12 |
| 4,965,561 | A * | 10/1990 | Havel ............................. | 345/46 |
| 5,384,912 | A * | 1/1995 | Ogrinc et al. ................. | 345/501 |
| 5,754,184 | A | 5/1998 | Ring et al. | |
| 6,188,454 | B1 * | 2/2001 | Greene et al. .................. | 349/74 |
| 6,337,692 | B1 * | 1/2002 | Rai et al. ....................... | 345/594 |
| 6,388,648 | B1 * | 5/2002 | Clifton et al. .................. | 345/88 |
| 6,753,931 | B2 | 6/2004 | Kane et al. | |
| 6,803,921 | B1 | 10/2004 | Balasubramanian et al. | |
| 6,882,445 | B1 * | 4/2005 | Takahashi et al. ............. | 358/1.9 |
| 6,995,738 | B2 | 2/2006 | Florence | |
| 7,116,378 | B1 * | 10/2006 | McDonald .................... | 348/743 |
| 7,131,762 | B2 * | 11/2006 | Richards et al. ............. | 362/583 |
| 7,199,839 | B2 | 4/2007 | Kim | |
| 7,210,794 | B2 | 5/2007 | Tangen | |

(Continued)

FOREIGN PATENT DOCUMENTS

| CN | 1479915 | 3/2004 |
|---|---|---|
| CN | 1627356 A | 6/2005 |

(Continued)

OTHER PUBLICATIONS

"Fargrymder och arbetsrymder" Feb. 9, 2005—Retrieved from the Internet.

(Continued)

*Primary Examiner* — Xiao M. Wu
*Assistant Examiner* — Phi Hoang
(74) *Attorney, Agent, or Firm* — Sughrue Mion, PLLC

(57) ABSTRACT

A color-processing method includes: selecting a target color gamut to produce an input color signal; calculating a mixture ratio enabling primary colors of the target color gamut to be created by mixing primary colors of a color gamut of the color reproduction apparatus to reproduce the input color signal therewith; producing primary colors reconfigured by mixing the primary colors of the color gamut of the color reproduction apparatus according to the calculated mixture ratio; adjusting an illuminant to match an output signal to a color gamut determined by the reconfigured primary colors; and converting the input color signal to match to the primary colors determined by the reconfigured primary colors. Further a user can arbitrarily set a color gamut in a range that a color reproduction apparatus can reproduce regardless of an input color signal without a quantization errors.

14 Claims, 5 Drawing Sheets

U.S. PATENT DOCUMENTS

| | | | |
|---|---|---|---|
| 7,283,181 B2 | 10/2007 | Allen et al. | |
| 8,115,776 B2* | 2/2012 | Selbrede et al. | 345/589 |
| 2002/0060662 A1 | 5/2002 | Hong | |
| 2002/0135597 A1 | 9/2002 | Kagawa et al. | |
| 2002/0159081 A1 | 10/2002 | Zeng | |
| 2003/0016198 A1 | 1/2003 | Nagai et al. | |
| 2003/0048815 A1* | 3/2003 | Cook | 372/3 |
| 2003/0086022 A1 | 5/2003 | White | |
| 2003/0179192 A1 | 9/2003 | Allen et al. | |
| 2003/0184557 A1* | 10/2003 | Wen | 345/590 |
| 2003/0184559 A1 | 10/2003 | Jiang et al. | |
| 2003/0214259 A9* | 11/2003 | Dowling et al. | 315/312 |
| 2003/0227577 A1 | 12/2003 | Allen et al. | |
| 2004/0021672 A1* | 2/2004 | Wada | 345/591 |
| 2004/0086176 A1* | 5/2004 | Meier et al. | 382/162 |
| 2004/0170319 A1* | 9/2004 | Maurer | 382/167 |
| 2004/0208339 A1* | 10/2004 | Abe et al. | 382/100 |
| 2004/0212783 A1* | 10/2004 | Wada | 353/31 |
| 2004/0212895 A1* | 10/2004 | Pate | 359/634 |
| 2005/0007390 A1 | 1/2005 | Yoshida et al. | |
| 2005/0122368 A1* | 6/2005 | Yamazaki et al. | 347/19 |
| 2005/0128497 A1 | 6/2005 | Hirashima et al. | |
| 2005/0179919 A1* | 8/2005 | Kato | 358/1.9 |
| 2005/0280850 A1 | 12/2005 | Kim et al. | |
| 2006/0105485 A1* | 5/2006 | Basin et al. | 438/27 |
| 2006/0221305 A1* | 10/2006 | Magarill | 353/31 |
| 2006/0262224 A1* | 11/2006 | Ha et al. | 348/582 |
| 2008/0260271 A1* | 10/2008 | Lundstrom et al. | 382/239 |
| 2009/0121992 A1* | 5/2009 | Asao et al. | 345/88 |

FOREIGN PATENT DOCUMENTS

| | | |
|---|---|---|
| EP | 0597797 A1 | 5/1994 |
| EP | 0613309 A2 | 8/1994 |
| EP | 0967790 A2 | 12/1999 |
| EP | 1102478 A2 | 5/2001 |
| EP | 1 205 902 A2 | 5/2002 |
| EP | 1 422 665 A1 | 5/2004 |
| JP | 5-260498 A | 10/1993 |
| JP | 7-274089 A | 10/1995 |
| JP | 9-322187 A | 12/1997 |
| JP | 10-319911 A | 12/1998 |
| JP | 11-17968 | 1/1999 |
| JP | 2001-188513 A | 7/2001 |
| JP | 2001-290458 A | 10/2001 |
| JP | 2002-027263 | 1/2002 |
| JP | 2002-041016 | 2/2002 |
| JP | 2002-118764 | 4/2002 |
| JP | 2002-140038 | 5/2002 |
| JP | 2003-345309 A | 12/2003 |
| KR | 92-14359 U | 7/1992 |
| KR | 1998-072902 A | 11/1998 |

OTHER PUBLICATIONS

Communication dated Mar. 30, 2010 from the Japanese Patent Office in Japanese Application No. 2006-123964.

Communication dated Apr. 12, 2011, issued by the Japanese Patent Office in counterpart Japanese Application No. 2006-123964.

Communication dated May 3, 2011, issued by the Korean Intellectual Property Office in counterpart Korean Application No. 10-2005-0053494.

Chinese Office Action mailed Aug. 1, 2008 in Chinese Application No. 2005-100779810.

Dutch Search Report issued Feb. 13, 2008 in Dutch Application No. NL 1029261.

Japanese Office Action dated Jul. 31, 2007 for Japanese Application No. 2005-176846.

Hungarian Search Report dated Nov. 29, 2006 issued in Hungarian Patent Application No. P0500602.

U.S. Appl. No. 11/151,432, filed Jun. 14, 2005, Il-do Kim et al.

* cited by examiner

FIG. 4

LED
SMPTE-C
Rec.709(sRGB)
PAL(EBU)
USER 1
USER 2

COLOR DISPLAY APPARATUS AND METHOD THEREFOR

CROSS-REFERENCE OF RELATED APPLICATIONS

This application claims benefit under 35 U.S.C. §119 from Korean Patent Application No. 2005-53494, filed on Jun. 21, 2005, the entire contents of which are incorporated herein by reference.

BACKGROUND OF THE INVENTION

1. Field of the Invention:

The present invention relates to a color reproduction apparatus having plural color reproduction ranges and a color signal-processing method therefor, and more particularly, to a color reproduction apparatus having plural color reproduction ranges and a color signal-processing method therefor capable of displaying an inputted color signal in a selected color gamut.

2. Description of the Related Art:

Generally, a color reproduction apparatus for reproducing colors, such as a monitor, scanner, printer, or the like, uses a color space or a color model appropriate for an application field thereof. For example, color image print apparatuses use a Cyan Magenta Yellow (CMY) color space, and color Cathode Ray Tube (CRT) monitors or computer graphic apparatuses use a Red Green Blue (RGB) color space. Apparatuses for handling hue, saturation, and intensity use an Hue Saturation Intensity (HSI) color space. In addition, even a Commission Internationale d'Eclairage (CIE) color space is used for definition of so-called device-independent colors that can be accurately reproduced in any kind of apparatuses, and such a CIE color space can be typically the CIE-XYZ, CIE-LUV, or CIE_LAB color space, or the like. CIE-LUV is a CIE-based color space used to represent additive color systems, including color lights and emissive phosphor displays. CIE-LAB is an independent color space used to represent subtractive systems, where light is absorbed by colorants, for example inks and dyes.

Although the types of color reproduction apparatuses can depend on a color space being used therefor, it is conventional to use three primary colors. For example, in an RGB color space used for color monitors or computer graphic apparatuses, three primary colors of red, green, and blue are used which can be added together, and, in a CMY color space used for color image print apparatuses, three primary colors of cyan, magenta, and yellow are used.

A color reproduction range that a color reproduction apparatus can reproduce is determined by the primary colors used by the apparatus. When a color reproduction apparatus reproduces images of a general broadcasting specification or a standard color signal specification, the color reproduction apparatus represents an input image by unchangeably using the primary colors specified in the broadcasting specification or standard.

Accordingly, when the color reproduction range of an inputted color signal is narrower than the color gamut of the color reproduction apparatus reproducing the inputted color signal, all the color reproduction range implementable by the color reproduction apparatus is not used. Further, quantization errors occur in the process of mapping the color reproduction range between the inputted color signal and the color reproduction apparatus reproducing the color signal. Still further, hardware implementation is difficult, requiring a very complicate algorithm for the process of mapping the color reproduction range.

Further, in a color reproducing apparatus, an input color signal can be reproduced according to the specification of the input color signal, but it is impossible to reproduce new colors according to user's selection. For example, the SMPTE color bars (SMPTE-C) are a type of television test pattern, and is a dominant video standard by the Society of Motion Picture and Television Engineers (SMPTE). In a color reproduction apparatus, such as an Light Emitting Diode (LED) display device, when an input such as SMPTE-C is provided, the LED display device can reproduce the color signal of the SMPTE-C broadcasting specification only within the LED color reproduction range.

Accordingly, a method for a display device is required which can reproduce an input color signal of diverse standard specifications selected by users or of a specification defined by users.

SUMMARY OF THE INVENTION

The present invention provides a color reproduction apparatus having plural color reproduction ranges and a color signal-processing method therefor, capable of displaying an input color signal in a color gamut selected by a user.

According to an aspect of the present invention, there is provided a color reproduction apparatus having plural color reproduction ranges, comprising a selection unit for selecting a target color gamut to reproduce an input color signal therein; a calculation unit for calculating a mixture ratio enabling primary colors of the target color gamut to be created by mixing primary colors of a color gamut of the color reproduction apparatus to produce the input color signal therewith; a primary color determination unit for producing primary colors reconfigured by mixing the primary colors of the color gamut of the color reproduction apparatus according to the calculated mixture ratio; a driving unit for adjusting a light amount of an illuminant in order for the input color signal to be matched for an output to a color gamut determined by the reconfigured primary colors; and a display unit for displaying an output signal converted for the input signal to be matched to the color gamut determined by the reconfigured primary colors.

The apparatus further comprises a color-coordinate conversion unit for converting a color coordinate of an inputted color signal into color coordinate values of a device-independent CIE-XYZ color space, and for providing the converted color coordinate values as the input color signal.

The target color gamut is any of a color gamut reproducing a National Television Standards Committee (NTSC) broadcasting specification, Phase Alternation line (PAL) broadcasting specification, and SMPTE-C broadcasting specification, a color gamut reproducing standard color signals of standard color space (sRGB) specification and RGB specification, a color gamut for an LED display device, and a color gamut set up by a user of the color reproduction apparatus.

The apparatus further comprises a storage unit for storing color coordinates of the target color gamut, and color coordinates of the primary colors of the color gamut of a color reproducing apparatus. The storage unit stores in a form of a lookup table the mixture ratio enabling the primary colors of the target color gamut to be produced by mixing the primary colors of the color gamut of the color reproduction apparatus according to the target color gamut that can be selected by the selection unit.

The driving unit adjusts the light amount of the illuminant by using either a Pulse Width Modulation (PWM) method or an Amplitude Modulation (AM) method according to a driving mode of the color reproduction apparatus.

According to an aspect of the present invention, there is provided a color-processing method, comprising steps of selecting a target color gamut to produce an input color signal therein; calculating a mixture ratio enabling primary colors of the target color gamut to be created by mixing primary colors of a color gamut of the color reproduction apparatus to reproduce the input color signal therewith; producing primary colors reconfigured by mixing the primary colors of the color gamut of the color reproduction apparatus according to the calculated mixture ratio; adjusting a light amount of an illuminant in order for the input color signal to be matched for an output to a color gamut determined by the reconfigured primary colors; and converting, for an output, the input color signal to match to the primary colors determined by the reconfigured primary colors.

The method further comprises converting a color coordinate of an inputted color signal into color coordinate values of a device-independent CIE-XYZ color space, and providing the converted color coordinate values as the input color signal. CIE developed a set of three imaginary primaries X, Y, and Z in order to be able to match any color L by mixing these primaries.

The target color gamut is any of a color gamut reproducing an NTSC broadcasting specification, a PAL broadcasting specification, a SMPTE-C broadcasting specification, a color gamut reproducing standard color signals of sRGB specification and RGB specification, a color gamut for an LED display device, and a color gamut set up by a user of the color reproduction apparatus.

The method further comprises step of storing color coordinates of the target color gamut and color coordinates of the primary colors of the color gamut of the color reproduction apparatus. Further, the storage step stores in a form of a lookup table the mixture ratio enabling the primary colors of the target color gamut to be created by mixing the primary colors of the color gamut of the color reproducing apparatus according to the target color gamut that can be selected.

Adjusting the light amount of the illuminant adjusts the light amount of the illuminant by either a Pulse Width Modulation (PWM) method or an Amplitude Modulation (AM) method according to a driving mode of the color reproduction apparatus.

BRIEF DESCRIPTION OF THE DRAWINGS

The above and/or other aspects of the present invention will be more apparent by describing certain exemplary embodiments of the present invention with reference to the accompanying drawings, in which:

FIG. 4 is a view for explaining a process of selecting a color gamut to reproduce an input color signal therein in the color signal-processing method according to the exemplary embodiment shown in FIG. 3;

DETAILED DESCRIPTION OF EXEMPLARY EMBODIMENTS

Hereafter, exemplary embodiments of the present invention will be described in detail with reference to the accompanying drawings.

The present invention processes an input color signal so that the input color signal inputted into a display device can be reproduced as a color signal of diverse broadcasting specifications, standard signal specifications selected by a user, or a specification defined by a user. Hereinafter, description will be made on color signal processing when a PAL broadcasting specification signal is inputted into an LED display device used as a color reproduction apparatus and a user selects a SMPTE-C color gamut as a color gamut for reproduction of the input color signal.

Figure 1:
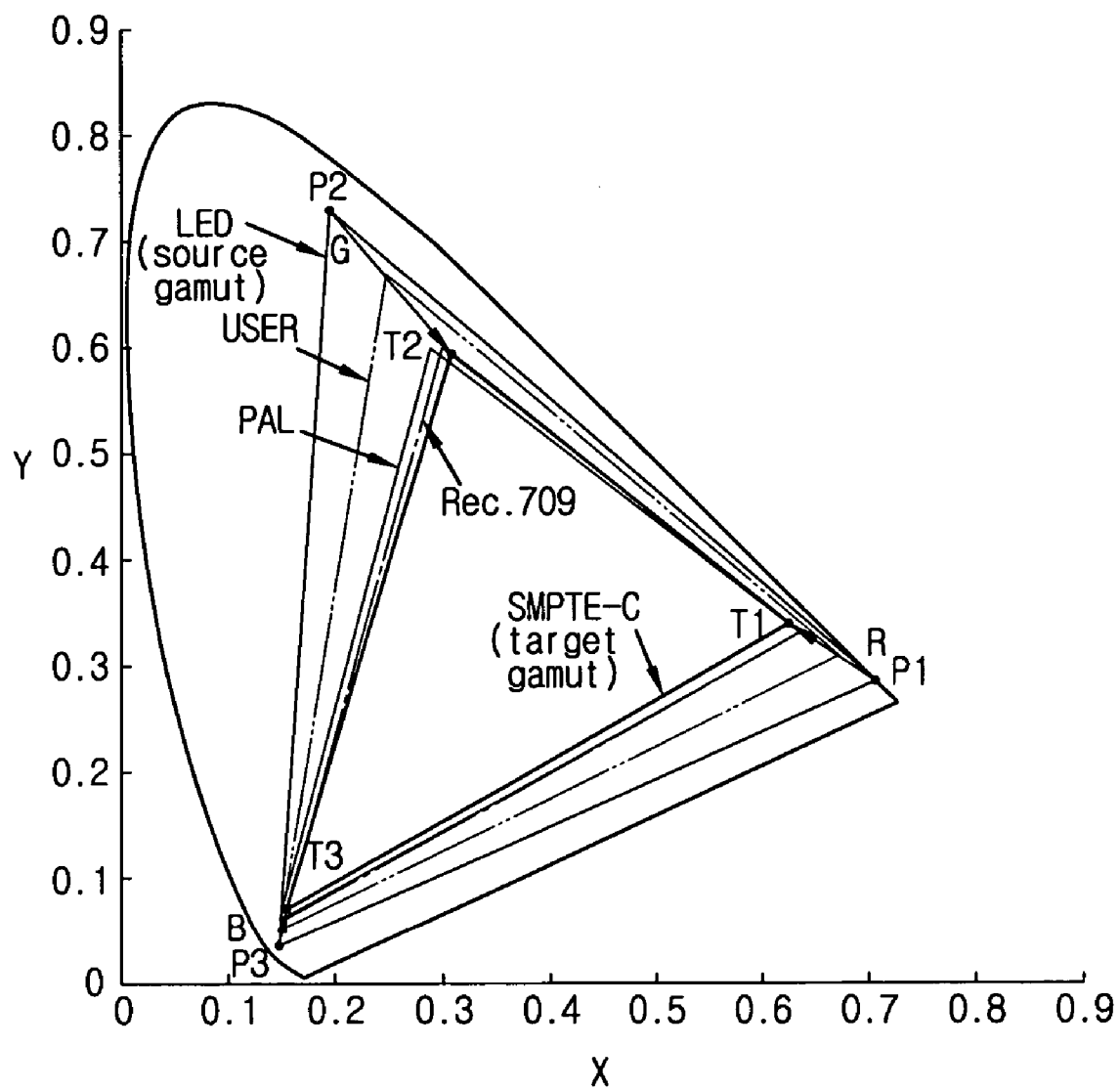
FIG. 1 is a view for schematically showing operations of a color reproduction apparatus having plural color reproduction ranges according to an exemplary embodiment of the present invention.

FIG. 1 is a view for schematically showing operations of a color reproduction apparatus having plural color reproduction ranges according to an exemplary embodiment of the present invention. FIG. 1 shows a CIE chromaticity diagram, which is a view for showing a color synthesis in a function of a red color x as the horizontal axis and a green color y as the vertical axis. In here, primary colors of a source color gamut as a color gamut of the LED display device are P1, P2, and P3, and primary colors of a target color gamut as a color gamut of the selected SMPTE-C color gamut are T1, T2, and T3.

In FIG. 1, an input color signal inputted into the LED display device can be reproduced in a color gamut to reproduce therein a color signal of a broadcasting specification such as National Television System Committee (NTSC), Phase Alternation by Line system (PAL), or SMPTE-C, or a color signal of a standard specification such as Rec. 709 (sRGB) of International Electro-Technical Commission (IEC), or in a color gamut defined by a user.

When the SMPTE-C is selected as a color gamut to reproduce the input color signal therein, the primary colors P1, P2, and P3 of the color gamut of the LED display device as a color reproduction apparatus are adjusted to the primary colors T1, T2, and T3 of the SMPTE-C as the selected target color gamut, respectively.

Figure 2:
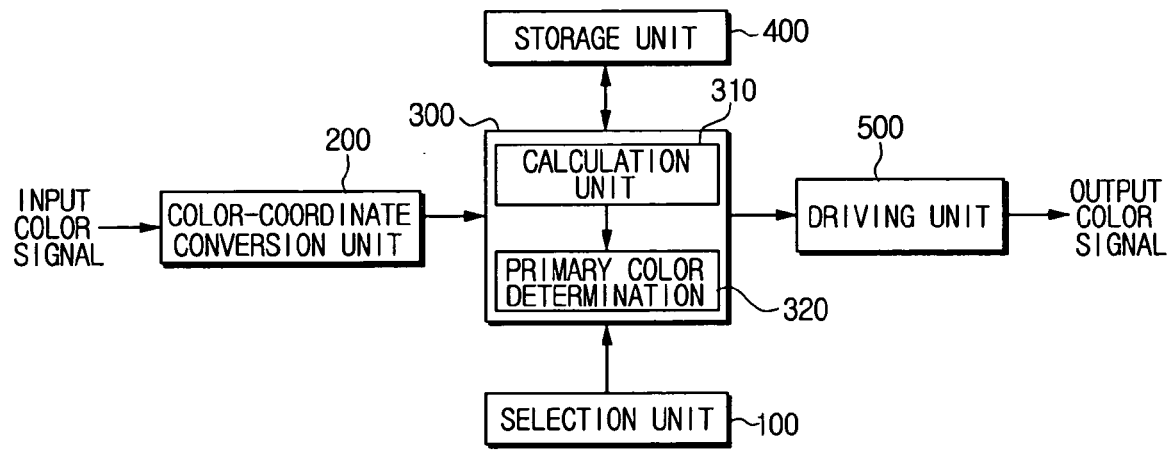
FIG. 2 is a block diagram for showing a color reproduction apparatus having plural color reproduction ranges according to an exemplary embodiment of the present invention.

FIG. 2 is a block diagram for showing the color reproduction apparatus having plural color reproduction ranges according to an exemplary embodiment of the present invention.

In FIG. 2, the color reproduction apparatus according to the invention has a selection unit 100, a color-coordinate conversion unit 200, a color gamut adjustment unit 300, a storage unit 400, and a driving unit 500.

The color-coordinate conversion unit 200 linearly corrects an input color signal into a linear color signal when the input color signal inputted into the display device is a non-linear color signal, and converts the corrected signal into color coordinates of a device-independent color space. In here, the input color signal can be a color signal of the broadcasting specification such as NTSC, PAL, and SMPTE-C, or of the standard specification such as Rec. 709 (sRGB) of IEC.

The selection unit 100 selects a target color gamut to reproduce therein the color-coordinates-converted input color signal of the color-coordinate conversion unit 200. In here, the selection unit 100 can be an On Screen Display (OSD) menu, remote controller, TV menu buttons, or the like, for the display device, and a user can select a color gamut to reproduce the input color signal therein, using the selection unit 100.

The color gamut adjustment unit 300 includes a calculation unit 310 and a primary color determination unit 320, and adjusts a color gamut of the LED display device as a source color gamut into the color gamut of the SMPTE-C broadcasting specification as a target color gamut selected through the selection unit 100.

That is, the color gamut adjustment unit 300 adjusts a source color gamut to the selected SMPTE-C color gamut by combining RGB primary colors of the display device, and adjusts the source color gamut to the target color gamut by adjusting primary colors of the source color gamut through calculations of values RR, RG, RB, GG, GR, GB, BB, BR, and BG to add with to the primary colors of the source color gamut.

The calculation unit 310 of the color gamut adjustment unit 300 calculates a mixing ratio enabling target primary colors to be created through mixture of primary colors of the display device, and the primary color determination unit 320 produces primary colors reconfigured by mixing the primary colors of the display device according to the calculated mixing ratio.

The driving unit 500 adjusts a light amount of illuminants of the display device so that the primary colors of the display device can be adjusted based on the reconfigured primary colors of the primary color determination unit 320. Using a Pulse Width Modulation (PWW) mode or an Amplitude Modulation (AM) mode depending on a driving mode of the display device, the driving unit 500 adjusts the light amount of the illuminants so that the input color signal can be converted for an output into a color gamut determined by the reconfigured primary colors. A display unit (not shown) reproduces the input color signal as an output converted into and matched to a color reproduction range determined by the reconfigured primary colors.

Figure 3:
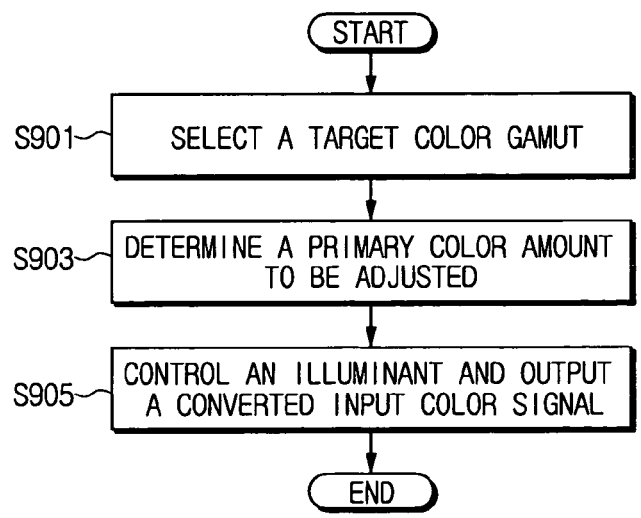
FIG. 3 shows a flow chart for explaining a color signal-processing method according to an exemplary embodiment of the present invention.

FIG. 3 is a flow chart for explaining a color signal-processing method according to an exemplary embodiment of the present invention. Hereinafter, description will be made with an LED display device as the color reproduction apparatus for example. Further, description will be made on a color signal-processing method capable of reproducing the input color signal of the PAL broadcast specification as a color signal of the SMPTE-C specification by adjusting a color gamut of the LED display device to the selected SMPTE-C color gamut if the color signal of the PAL broadcast specification is inputted to the LED display device but a user selects the SMPTE-C to reproduce the input color signal therein.

In FIG. 3, first, a target color gamut is selected in which the input color signal inputted to the display device is reproduced (S901). In here, the target color gamut can be selected through the OSD menu, remote controller, or TV menu buttons of the display device.

Figure 4:
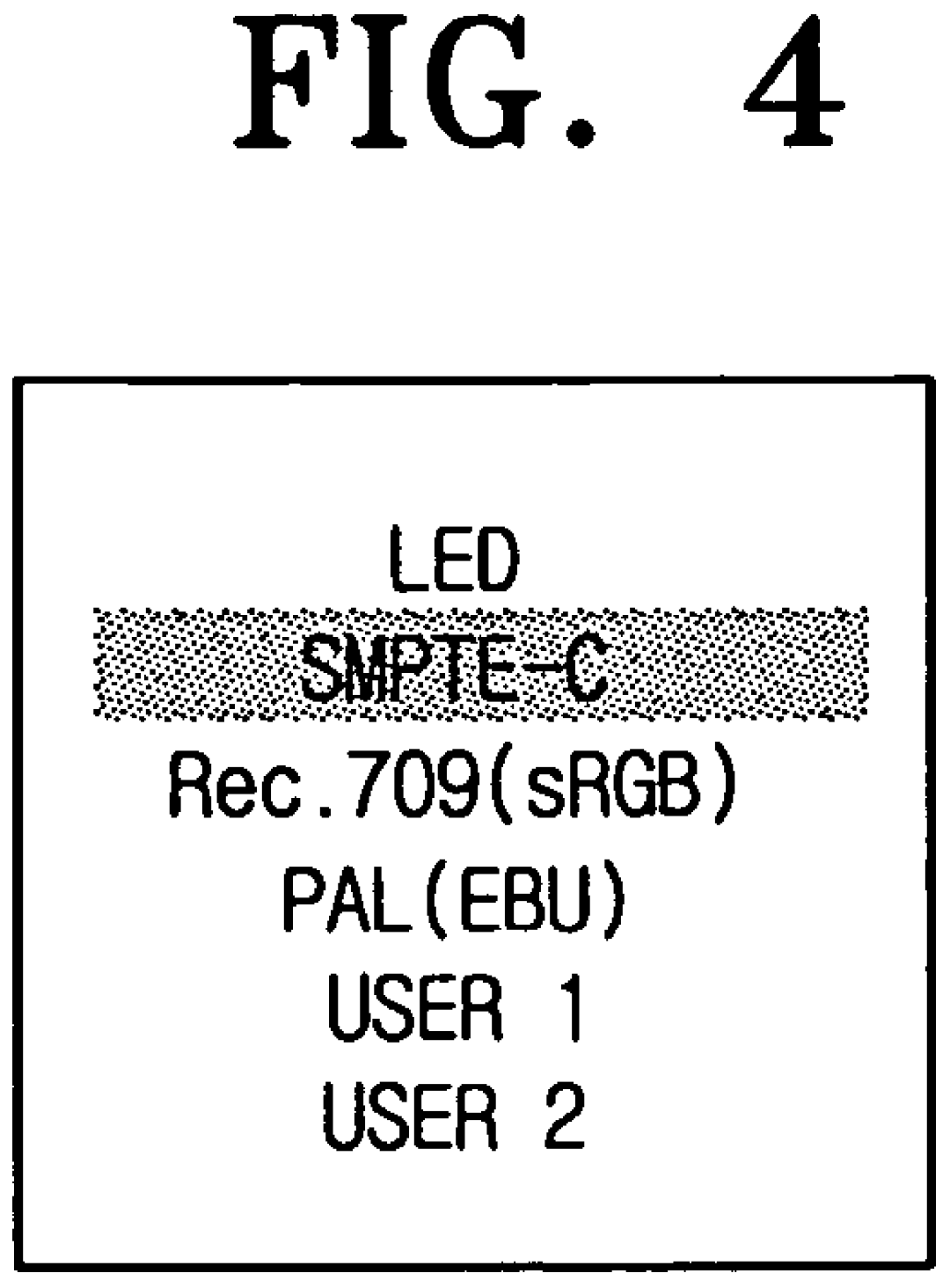

FIG. 4 is a view for explaining a process of selecting a color gamut to reproduce the input color signal therein in the color signal-processing method of FIG. 3. FIG. 4 is a view for showing selection of a target color gamut through the OSD menu. As shown in FIG. 4, the display device displays on its screen the types of reproducible color gamut thereon, such as "LED", "SMPTE-C", "Rec. 709 (sRGB)", "PAL(EBL)", "USER1", "USER2". A user can select not only a color gamut of a signal of a broadcasting specification such as the "SMPTE-C" but also an arbitrary color gamut such as "USER1" or "USER2".

Next, a mixing ratio is calculated in which primary colors of the target color gamut can be created through mixture of primary colors of the display device, and reconfigured primary colors are calculated through mixture of the primary colors of the display device according to the calculated mixing ratio (S903). The mixing ratio enabling the primary colors of the target color gamut through mixture of the primary colors of the display device is determined based on color coordinates of the primary colors of the display device and color coordinates of the primary colors of the target color gamut which are stored in the storage unit 400.

Further, the input color signal to the display device are linearly corrected into a linear color signal when the input color signal is a non-linear color signal, and converted into the color coordinates of the CIE-XYZ color space as a device-independent color space, so the reconfigured primary colors are calculated. In here, the input color signal can be a color signal of a broadcasting specification such as NTSC, PAL, or SMPTE-C, a color signal of a standard specification such as Rec. 709 (sRGB) of IEC, or the like.

Description will be made in detail as below on the process for calculating the mixing ratio and the reconfigured primary colors. If a color gamut of the display device is the LED (source color gamut) shown in FIG. 1, Ps denotes a matrix of color coordinates $P1(x_{rr}, y_{rr}, z_{rr})$, $P2(x_{gg}, y_{gg}, z_{gg})$, $P3(x_{bb}, y_{bb}, z_{bb})$ of primary colors of the display device, and a white tristimulus value is $Fws=(X_{ws}, Y_{ws}, Z_{ws})$, the corresponding colorimetric display model can be expressed in Equation 1 as below.

$$F_S^T = Ms \cdot (R, C, B)^T = Ps \cdot Ns \cdot (R, G, B)^T \quad \text{[Equation 1]}$$

in here, $$Ps = \begin{bmatrix} x_{rr} & x_{gg} & x_{bb} \\ y_{rr} & y_{gg} & y_{bb} \\ z_{rr} & z_{gg} & z_{bb} \end{bmatrix},$$

$$Ns = \begin{bmatrix} N_r & 0 & 0 \\ 0 & N_g & 0 \\ 0 & 0 & N_b \end{bmatrix},$$

$$Ms = \begin{bmatrix} X_{rr} & X_{gg} & X_{bb} \\ Y_{rr} & Y_{gg} & Y_{bb} \\ Z_{rr} & Z_{gg} & Z_{bb} \end{bmatrix}$$

In Equation 1, when the normalized matrix Ns is maximized with R=G=B=1, that is, a white color, setting is established in Fs=Fws. A red (R) primary color vector $Frs=(x_{rr}, y_{rr}, z_{rr})$ represents a tristimulus value of a red color reproduced when (R, G, B)=(1, 0, 0). Likewise, a green (G) primary color vector $Fgs=(x_{gg}, y_{gg}, z_{gg})$ represents a tristimulus value of a green color reproduced when (R, G, B)=(0, 1, 0), and a blue (B) primary color vector $Fbs=(x_{bb}, y_{bb}, z_{bb})$ represents a tristimulus value of a blue color reproduced when (R, G, B)=(0, 0, 1). Accordingly, a color gamut of an input image is defined as in Equation 1.

In the same manner, if it is assumed that a color reproduction range of the input color signal corresponds to the SMPTE-C (target color gamut), Pt denotes a matrix of color coordinates $T1(x_{rt}, y_{rt}, z_{rt})$, $T2(x_{gt}, y_{gt}, z_{gt})$, $T3(x_{bt}, y_{bt}, z_{bt})$ of primary colors of the SMPTE-C, and a white tristimulus value $Fws=(x_{wt}, y_{wt}, z_{wt})$ represents a white tristimulus value, the display model according to the standard primary colors can be expressed in Equation 2 as below.

$$Ft^T = Mt \cdot (R, C, B)^T = Pt \cdot Nt \cdot (R, G, B)^T \quad \text{[Equation 2]}$$

In here, $$Pt = \begin{bmatrix} x_{rt} & x_{gt} & x_{bt} \\ y_{rt} & y_{gt} & y_{bt} \\ z_{rt} & z_{gt} & z_{bt} \end{bmatrix},$$

$$Nt = \begin{bmatrix} N_{rt} & 0 & 0 \\ 0 & N_{gt} & 0 \\ 0 & 0 & N_{bt} \end{bmatrix},$$

$$Mt = \begin{bmatrix} X_{rt} & X_{gt} & X_{bt} \\ Y_{rt} & Y_{gt} & Y_{bt} \\ Z_{rt} & Z_{gt} & Z_{bt} \end{bmatrix}$$

The normalized matrix Nt can be calculated based on the standard white provided in Equation 1. Likewise, Frt=($x_{rt}$, $y_{rt}$, $z_{rt}$) indicates a red primary color vector of the SMPTE-C, Fgt=($x_{gt}$, $y_{gt}$, $z_{gt}$) a green primary color vector of the SMPTE-C, and Fbt=($x_{bt}$, $y_{bt}$, $z_{bt}$) a blue primary color vector of the SMPTE-C.

Equation 3 as below can be used to calculate a primary color vector (Frt, Fgt, Fbt) of the target color gamut as a color gamut of the SMPTE-C satisfying Equation 2 based on the primary color vector (Frs, Fgs, Fbs) of the source color gamut as a color gamut of the display device.

$$F_{rt} = k_{rr} \cdot F_{rs} + k_{gr} \cdot F_{gs} + k_{br} \cdot F_{bs}$$

$$F_{gt} = k_{rg} \cdot F_{rs} + k_{gg} \cdot F_{gs} + k_{bg} \cdot F_{bs}$$

$$F_{bt} = k_{rb} \cdot F_{rs} + k_{gb} \cdot F_{gs} + k_{bb} \cdot F_{bs} \quad \text{[Equation 3]}$$

Equation 3 can be expressed as follows.

$$(F_{rt} F_{gt} F_{bt}) = \quad \text{[Equation 4]}$$

$$(F_{rs} F_{gs} F_{bs}) \cdot \begin{bmatrix} k_{rr} & k_{rg} & k_{rb} \\ k_{gr} & k_{gg} & k_{gb} \\ k_{br} & k_{bg} & k_{bb} \end{bmatrix} = (F_{rs} F_{gs} F_{bs}) \cdot G$$

in here, $G = \begin{bmatrix} k_{rr} & k_{rg} & k_{rb} \\ k_{gr} & k_{gg} & k_{gb} \\ k_{br} & k_{bg} & k_{bb} \end{bmatrix}$ Accordingly, the matrix G, which creates primary colors of a target color gamut in Equation 4, becomes a mixing ratio of the primary colors of the display device. However, since the matrix G can occasionally have the diagonal component ($k_{rr}$, $k_{gg}$, $k_{bb}$) being a major signal smaller than the maximum value of '1', the matrix G is divided for standardization by N=Max($k_{rr}$, $k_{gg}$, $k_{bb}$) as expressed in Equation 5 as below so that a color gamut determined by a target color gamut is maximized.

$$Gn = G/N \quad \text{[Equation 5]}$$

Accordingly, if a light amount of the illuminant of each channel is adjusted by a constant of the Gn matrix after calculation based on Equation 5, the display device can create primary colors of a color gamut to reproduce the SMPTE-C signal therein based on the primary colors of the display device.

Next, the light amount of the illuminant is controlled in order for the input color signal to be matched for an output into a color gamut determined by the reconfigured primary colors of the display device, and the converted input color signal is outputted (S905). Equation 6 is used to convert the input color signal for an output in order for the converted input color signal to match to a color gamut determined by the reconfigured source primary colors.

$$\begin{bmatrix} R' \\ G' \\ B' \end{bmatrix} = Mt^{-1} \cdot Ms \begin{bmatrix} R \\ G \\ B \end{bmatrix} \quad \text{[Equation 6]}$$

in here, $$Mt = \begin{bmatrix} X_{rt} & X_{gt} & X_{bt} \\ Y_{rt} & Y_{gt} & Y_{bt} \\ Z_{rt} & Z_{gt} & Z_{bt} \end{bmatrix},$$

$$Ms = \begin{bmatrix} X_{rr} & X_{gg} & X_{bb} \\ Y_{rr} & Y_{gg} & Y_{bb} \\ Z_{rr} & Z_{gg} & Z_{bb} \end{bmatrix}$$

Meanwhile, depending on a selected target color gamut, mixing ratios of source color gamut can be calculated in advance and stored in a form of a lookup table, the mixing ratios being used for creating primary colors of the target color gamut from primary colors of a color gamut as a source color gamut of the display unit. Further, programs for microcomputers can be used for calculation of the mixing ratios, and fabricated in an Application Specific Integrated Circuit (ASIC) chip.

Figure 5A:
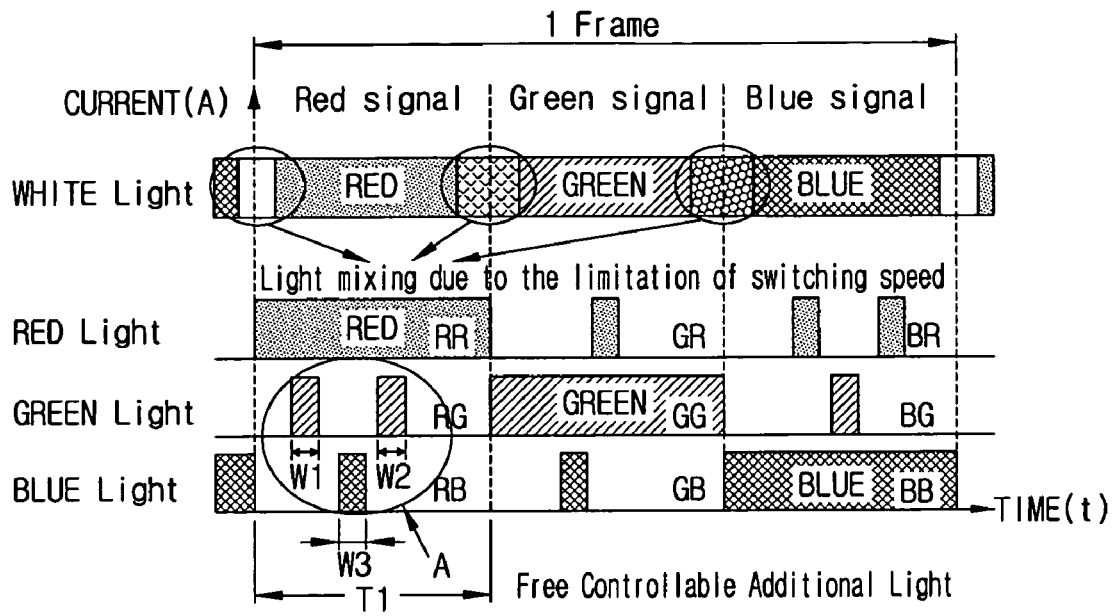
FIGS. 5A and 5B are views for explaining a process of adjusting a color gamut in the color signal-processing method according to the exemplary embodiment shown in FIG. 3.
Figure 5B:
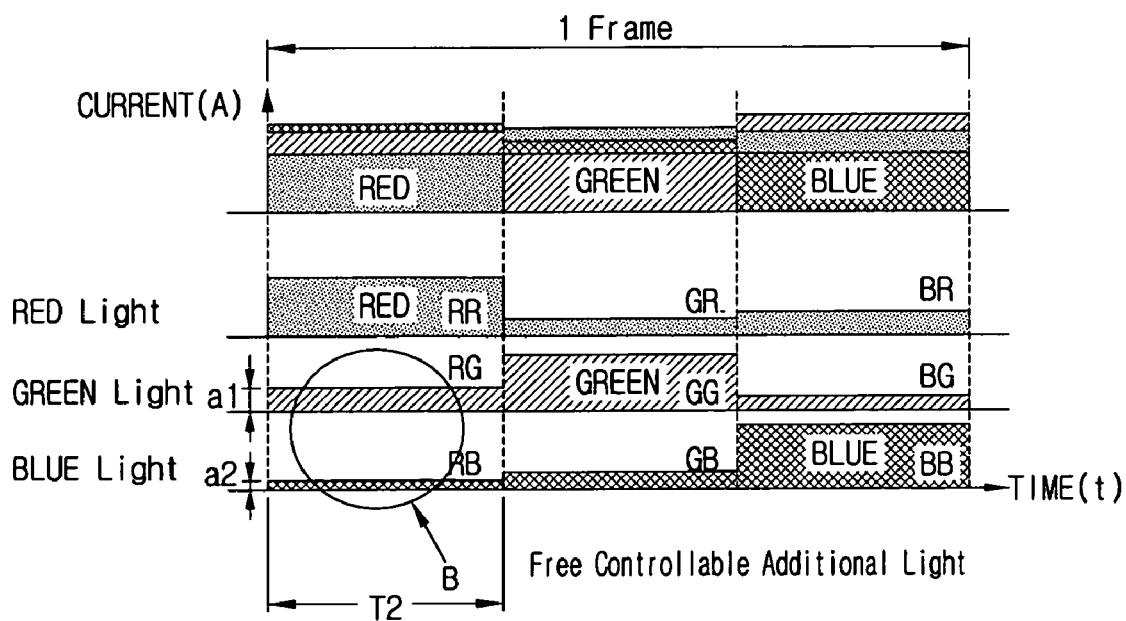

FIGS. 5A and 5B are views for explaining a process for adjusting a color gamut in the color signal-processing method of FIG. 3.

FIG. 5A is a view for showing intensity of a mixing color for mixture with primary colors of the display device is determined by the Pulse Width Modulation (PWM) mode. In here, the horizontal axis indicates time and the vertical axis can indicate current A or voltage V.

In FIG. 5A, a mixing color for mixture with a "RED signal" for a time period T1 is "RB" by a "BLUE Light" in order for the primary colors of the LED display device to be created into the primary colors of the SMPTE-C. Further, an amount of the mixing color "RB" for mixture with the "RED signal" is an amount for a time period W3. Furthermore, a mixing color for mixture with the "RED signal" for the time period T1 is "RG" by a "GREEN Light", and an amount of "RG" needs to be mixed with the "RED signal" for time periods of W1 and W3.

FIG. 5B is a view for showing that the Amplitude Modulation (AM) mode is used for determination of intensity of a mixing color for mixture with the primary colors of the display device. In here, the horizontal axis indicates time and the vertical axis can be current A or voltage V.

In FIG. 5B, a mixing color for mixture with the "RED signal" for a time period T2 is "RG" by a "GREEN Light" in order for the primary colors of the LED display device to be created into the primary colors of the SMPTE-C. Further, an amount of the mixing color "RG" for mixture with the "RED signal" is an amount for a time period a1. Furthermore, a mixing color for mixture with the "RED signal" for the time period T1 is "RG" by a "BLUE Light", and an amount of "RG" needs to be mixed with the "RED signal" for a time period a2.

The amount of a mixing color for mixture with the primary colors of the display device through the PWM mode or the AM mode varies depending on a driving mode of the display device.

Figure 6:
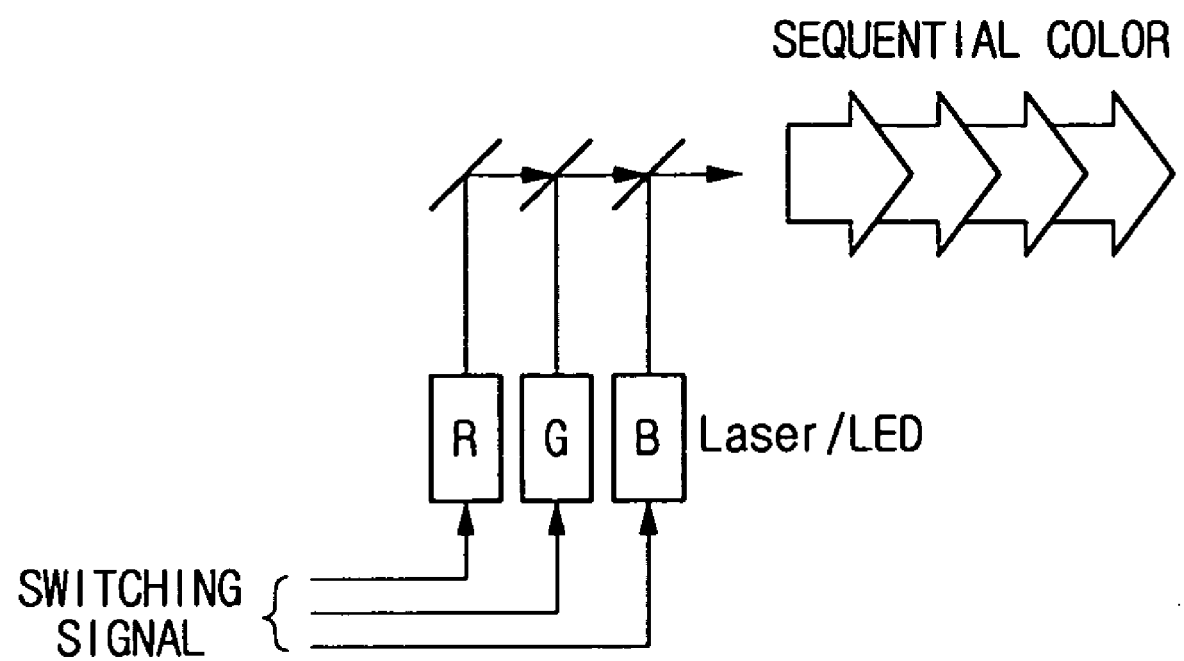
FIG. 6 is a view for explaining a process of adjusting a light amount of an illuminant for color gamut adjustment in the color signal-processing method according to the exemplary embodiment shown in FIG. 3.

FIG. 6 is a view for explaining a process for adjusting a light amount of an illuminant for adjustment of a color gamut in the color signal-processing method according to an exemplary embodiment shown in FIG. 3.

In FIG. 6, primary colors of a target color gamut are created through the control of illuminants of the display device by switching signals and primary colors of the display device.

As stated above, according to an exemplary embodiment of the present invention, a user can arbitrarily set a color gamut in a range that a color reproduction apparatus can reproduce regardless of a color signal inputted to the color reproduction apparatus, so plural color gamut that the color reproduction apparatus can select can be created without a quantization errors.

The foregoing embodiments and aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A color display apparatus comprising:
    a plurality of primary color light sources that generate original primary color lights; and
    a switching unit that controls an operation state of each of the plurality of primary color light sources to emit the respective original primary color lights;
    wherein, for each time period of a plurality of time periods of a frame, a different one of the plurality of primary color light sources is switched to an operation state by the switching unit to emit a respective original primary color light at a full amplitude for the corresponding time period, at least one of the other primary color light sources is switched to an operation state by the switching unit to emit at least another respective original primary color light at a partial amplitude for the corresponding time period so that at least two of the original primary color lights are mixed to produce one target primary color of a plurality of target primary colors.

2. The color display apparatus of claim 1, wherein the color display apparatus generates an output video based on the plurality of target primary colors, and the output video has a brightness that is higher than a brightness of an output video based on original primary colors from the original primary color lights.

3. The color display apparatus of claim 1, wherein the color display apparatus generates an output video based on the plurality of target primary colors, and the output video has a contrast that is higher than a contrast of an output video based on original primary colors from the original primary color lights.

4. The color display apparatus of claim 1, wherein the switching unit controls the operation state of each of the plurality of primary color light sources using switching signals, and the switching signals are currents or voltages.

5. The color display apparatus of claim 1, wherein at least one of the plurality of primary color light sources is a light emitting diode.

6. The color display apparatus of claim 1, wherein at least one of the plurality of primary color light sources is a laser.

7. The color display apparatus of claim 1, further comprising
    a selection unit which selects a target color gamut to reproduce an input color signal therein;
    a calculation unit which calculates a mixture ratio enabling the plurality of the target primary colors of the target color gamut to be created by mixing original primary colors of a color gamut of the plurality of primary color light sources to produce the input color signal therewith;
    a primary color determination unit which produces the plurality of the target primary colors of the target color gamut by mixing the original primary color lights of the plurality of primary color light sources according to the calculated mixture ratio;
    a driving unit which adjusts a light amount of illuminants corresponding to the original primary colors of the plurality of primary color light sources in order to match the input color signal to an output signal in the target color gamut determined by the plurality of the target primary colors of the target color gamut; and
    a display unit which displays the output signal converted from the input color signal and matched to the target color gamut.

8. A color-signal processing method for a display device including a plurality of primary color light sources that generate original primary color lights, the color-signal processing method comprising:
    controlling an operation state of each of the plurality of primary color light sources to emit the original primary color lights,
    wherein the controlling comprises, for each time period of a plurality of time periods of a frame, switching an operation state of a different one of the plurality of primary color light sources to emit a respective original primary color light at a full amplitude for the corresponding time period, switching an operation state of at least one of the other primary color light sources to emit at least another respective original primary color light at a partial amplitude for the corresponding time period so that at least two of the original primary color lights are mixed to produce one target primary color of a plurality of target primary colors.

9. The color-signal processing method of claim 8, further comprising:
    generating an output video based on the plurality of target primary colors, the output video having a brightness that is higher than a brightness of an output video based on original primary colors from the original primary color lights.

10. The color-signal processing method of claim 8, further comprising:
    generating an output video based on the plurality of target primary colors, the output video having a contrast that is higher than a contrast of an output video based on original primary colors from the original primary color lights.

11. The color-signal processing method of claim 8, wherein the controlling further comprises controlling the operation state of each of the plurality of primary color light sources using switching signals, and the switching signals are currents or voltages.

12. The color-signal processing method of claim 8, wherein at least one of the plurality of primary color light sources is a light emitting diode.

13. The color-signal processing method of claim 8, wherein at least one of the plurality of primary color light sources is a laser.

14. The color-signal processing method of claim 8, further comprising:
   selecting a target color gamut to reproduce an input color signal therein;
   determining a mixture ratio enabling the plurality of the target primary colors of the target color gamut to be created by mixing original primary colors of a color gamut of the plurality of primary color light sources to produce the input color signal therewith;
   produces the plurality of the target primary colors of the target color gamut by mixing the original primary color lights of the plurality of primary color light sources according to the calculated mixture ratio;
   adjusting a light amount of illuminants corresponding to the original primary colors of the plurality of primary color light sources in order to match the input color signal to an output signal in the target color gamut determined by the plurality of the target primary colors of the target color gamut; and
   displaying the output signal converted from the input color signal and matched to the target color gamut.

* * * * *